(12) United States Patent
LaPera et al.

(10) Patent No.: US 11,371,375 B2
(45) Date of Patent: Jun. 28, 2022

(54) HEATSHIELD WITH DAMPER MEMBER

(71) Applicant: United Technologies Corporation, Farmington, CT (US)

(72) Inventors: Joshua G. LaPera, West Hartford, CT (US); Julian Partyka, West Springfield, MA (US); Timothy J. Harding, Harwinton, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 218 days.

(21) Appl. No.: 16/544,013

(22) Filed: Aug. 19, 2019

(65) Prior Publication Data
US 2021/0054756 A1 Feb. 25, 2021

(51) Int. Cl.
F01D 11/00 (2006.01)
F01D 5/10 (2006.01)
F01D 5/30 (2006.01)
F01D 25/24 (2006.01)
F02C 7/28 (2006.01)
F16J 15/44 (2006.01)

(52) U.S. Cl.
CPC ............ F01D 11/005 (2013.01); F01D 5/10 (2013.01); F01D 5/3015 (2013.01); F01D 25/246 (2013.01); F02C 7/28 (2013.01); F16J 15/442 (2013.01); F05D 2220/323 (2013.01); F05D 2230/60 (2013.01); F05D 2240/11 (2013.01); F05D 2240/15 (2013.01); F05D 2240/55 (2013.01); F05D 2260/30 (2013.01)

(58) Field of Classification Search
CPC . F01D 11/005; F01D 5/08; F01D 5/10; F01D 25/00; F01D 25/04; F02C 7/24
See application file for complete search history.

(56) References Cited

U.S. PATENT DOCUMENTS 4,793,772 A * 12/1988 Zaehring ............... F04D 29/584
416/95
5,195,868 A * 3/1993 Plemmons ............ F01D 25/145
29/525.02
8,840,375 B2 9/2014 Virkler
2008/0197575 A1* 8/2008 El-Aini .................. F01D 11/02
277/303

(Continued)

FOREIGN PATENT DOCUMENTS

EP 2474707 7/2012

OTHER PUBLICATIONS

European Search Report for European Patent Application No. 20189693.3 completed Dec. 9, 2020.

Primary Examiner — Christopher Verdier
Assistant Examiner — Cameron A Corday
(74) Attorney, Agent, or Firm — Carlson, Gaskey & Olds, P.C.

(57) ABSTRACT

A gas turbine engine includes a shaft and a heatshield that circumscribes the shaft. The heatshield defines a cylindrical body that has radially inner and outer sides and extends between first and second axial ends. The heatshield is exclusively supported on the shaft at the first and second axial ends. The heatshield includes at least one seal member on the radially outer side. A damper member is disposed at the radially inner side of the heatshield for attenuating vibration of the heatshield.

18 Claims, 3 Drawing Sheets

(56) References Cited

U.S. PATENT DOCUMENTS

| | | | |
|---|---|---|---|
| 2009/0214347 A1* | 8/2009 | Cloarec | F16B 21/18 |
| | | | 416/204 A |
| 2012/0177495 A1* | 7/2012 | Virkler | F01D 5/3015 |
| | | | 416/182 |
| 2017/0321556 A1 | 11/2017 | Pankratov | |
| 2017/0370226 A1 | 12/2017 | Hummel et al. | |
| 2020/0072055 A1 | 3/2020 | Winder et al. | |

* cited by examiner

HEATSHIELD WITH DAMPER MEMBER

BACKGROUND

A gas turbine engine typically includes a fan section, a compressor section, a combustor section, and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

SUMMARY

A gas turbine engine according to an example of the present disclosure includes a shaft and a heatshield that circumscribes the shaft. The heatshield defines a cylindrical body that has radially inner and outer sides and extends between first and second axial ends. The heatshield is exclusively supported on the shaft at the first and second axial ends. The heatshield includes at least one seal member on the radially outer side. A damper member is disposed at the radially inner side of the heatshield for attenuating vibration of the heatshield.

In a further embodiment of any of the foregoing embodiments, the shaft includes a first shaft segment and a second shaft segment coupled in a joint to the first shaft segment, the heatshield circumscribing the joint.

In a further embodiment of any of the foregoing embodiments, the heatshield has an axial length from the first axial end to the second axial end that is from 2.5 centimeters to 13 centimeters.

In a further embodiment of any of the foregoing embodiments, the heatshield defines an axial length from the first axial end to the second axial end, and the seal member is located in a range of 25% to 75% of the axial length.

In a further embodiment of any of the foregoing embodiments, the inner side of the heatshield defines a groove, and the damper member is seated in the groove.

In a further embodiment of any of the foregoing embodiments, the heatshield has a diameter and defines an axial length from the first axial end to the second axial end. The diameter and the axial length fall within a vibration excitation range. The damper member is configured to be moveable within the groove with respect to the vibration excitation range.

In a further embodiment of any of the foregoing embodiments, the heatshield further comprises first and second projecting lips flanking the groove.

In a further embodiment of any of the foregoing embodiments, the groove is adjacent the at least one seal member.

In a further embodiment of any of the foregoing embodiments, the at least one seal member includes first and second seal members, and the groove is between the first and second seal members.

In a further embodiment of any of the foregoing embodiments, there is an annular dead space between the heatshield and the shaft.

In a further embodiment of any of the foregoing embodiments, the heatshield and the damper member are formed of a superalloy.

In a further embodiment of any of the foregoing embodiments, the heatshield is rotatable with the first and second rotors, and further includes a static seal member sealing with the at least one seal member on the heatshield.

In a further embodiment of any of the foregoing embodiments, the damper member is a split ring.

A heatshield assembly for a gas turbine engine according to an example of the present disclosure includes a heatshield that defines a cylindrical body that has radially inner and outer sides and extends between first and second axial ends. The heatshield has at least one seal member on the radially outer side, and a split ring damper member disposed at the radially inner side of the heatshield for attenuating vibration of the heatshield.

In a further embodiment of any of the foregoing embodiments, the heatshield has an axial length from the first axial end to the second axial end that is from 2.5 centimeters to 13 centimeters.

In a further embodiment of any of the foregoing embodiments, the heatshield defines an axial length from the first axial end to the second axial end, and the seal member is located in a range of 25% to 75% of the axial length.

In a further embodiment of any of the foregoing embodiments, the inner side of the heatshield defines a groove, and the damper member is seated in the groove.

In a further embodiment of any of the foregoing embodiments, the groove is adjacent the at least one seal member.

In a further embodiment of any of the foregoing embodiments, the at least one seal member includes first and second seal members, and the groove is between the first and second seal members.

In a further embodiment of any of the foregoing embodiments, the heatshield further comprises first and second projecting lips flanking the groove.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
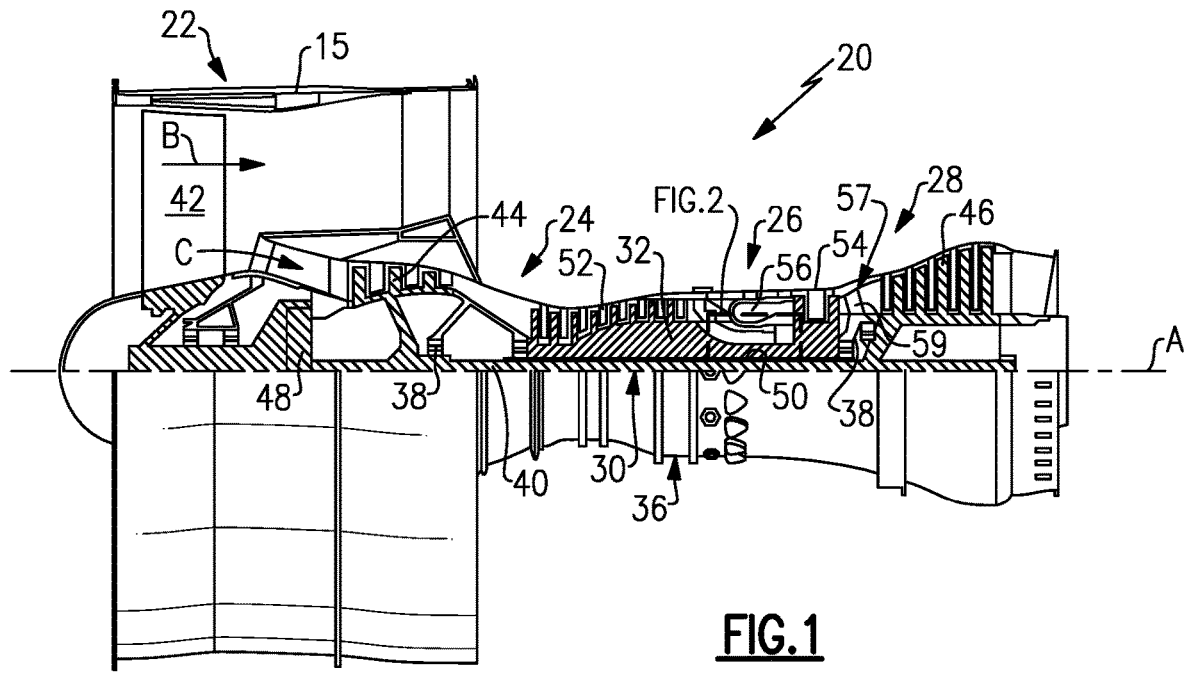
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]^0.5. The "Low corrected fan tip speed" as disclosed herein according to one non-limiting embodiment is less than about 1150 ft/second (350.5 meters/second).

Figure 2:
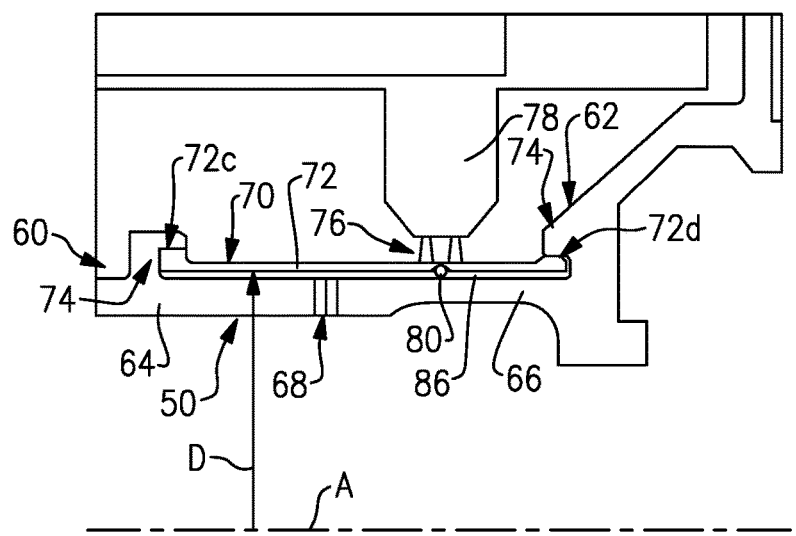
FIG. 2 illustrates a magnified view of a portion of the engine.

FIG. 2 illustrates a magnified view of a portion of the engine 20 that is generally located radially inwards of the combustor section 26. In this example, the shaft 50 couples the high pressure compressor 52 and the high pressure turbine 54. As shown, the shaft 50 is an assembly of a first shaft segment 60 and a second shaft segment 62. The shaft segments 60/62 include, respectively, first and second cylindrical portions 64/66 that generally extend axially. The cylindrical portions 64/66 in this example are coupled together at a joint 68. For instance, the joint 68 may be, but is not limited to, a curvic coupling.

Figure 3:
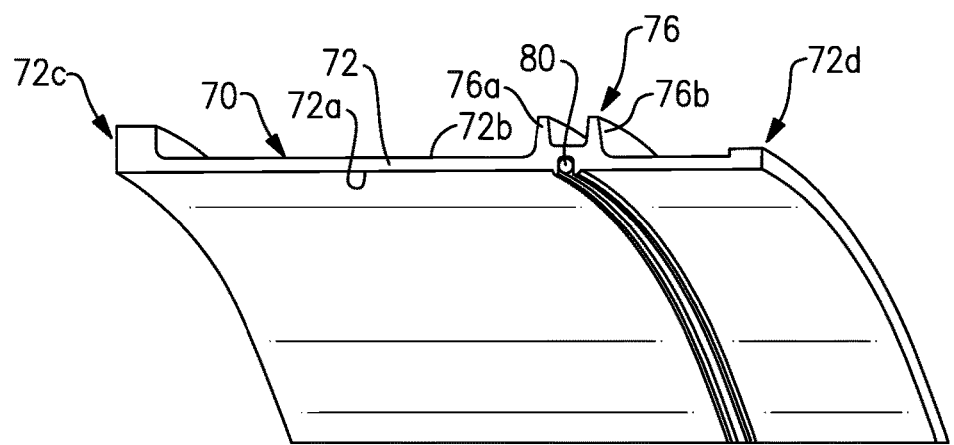
FIG. 3 illustrates an isolated view of a heatshield of the engine.

A heatshield 70 circumscribes the cylindrical portions 64/66, including the joint 68 (if present), and serves to thermally protect the portions 64/66. Although not shown in FIG. 2, the heatshield 70 also serves to shield the inner shaft 40 that is concentric with the shaft 50. It is to be further appreciated that the heatshield 70 may alternatively be used in a single-shaft engine that does not have concentric shafts, or in multi-shaft engines that have more than two concentric shafts. The heatshield 70 may be formed of a superalloy, such as a nickel-based superalloy. The heatshield 70 is also shown in an isolated view in FIG. 3 and an isolated sectioned view in FIG. 4. The heatshield 70 defines a cylindrical body 72 that has a radially inner side 72a and a radially outer side 72b. The cylindrical body 72 extends between a first axial end 72c and a second axial end 72d. For instance, the axial ends 72c/72d are include flanges or are otherwise enlarged in order to facilitate attachment.

As shown in FIG. 2, the heatshield 70 is exclusively supported on the first shaft segment 60 and the second shaft segment 62 at the first and second axial ends 72c/72d. The heatshield 70 is thus affixed with the shaft segments 60/62 and is co-rotatable therewith. For example, the shaft segments 60/62 include connectors 74 that receive the axial ends 72c/72d of the heatshield and trap the heatshield 70 there between. The term "exclusively supported" refers to the heatshield 70 being supported only at its axial ends 72c/72d, without any other structural supports between the ends 72c/72d. In this regard, the only locations on the heatshield 70 that are in contact with the shaft segments 60/62 are the axial ends 72c/72d.

The heatshield 70 further includes at least one seal member 76 on the radially outer side 72b of the cylindrical body 72. In the example shown, there are two seal members 76a/76b, which are knife edge seals. There is a static seal member 78 (FIG. 2) located opposite the seal members 76a/76b. The static seal member 78 may include an abradable member, such as a honeycomb, that seals with the seal members 76a/76b. The static seal member 78 is non-rotational and may a part of, but is not limited to, a tangential on-board injector ("TOBI").

The heatshield 70 falls within a vibration excitation range. Vibration is a function of an axial length (L) of the heatshield 70, the diameter D of the heatshield (which is also the radial distance from the engine axis A), and the heatshield 70 being exclusively end-supported. Speed, mating components, material properties, and stiffness also influence vibration. For example, the axial length L of the heatshield 70 is at least 2.5 centimeters and may be up to about 13 centimeters, and the diameter D is from 20 centimeters to 30 centimeters. It is within this length-diameter-exclusive end-support range that significant vibration occurs. In such a vibration excitation range the heatshield 70 vibrates due to resonance, coincidence, and/or aeroelastic instability (flutter). And while a limited degree of interference is desired between the seal member 76 and the static seal member 78 to maintain good sealing, at maximum amplitudes the vibration may increase interference above desired levels. In this regard, in order to facilitate attenuation of the vibration, there is a damper member 80 disposed at the radially inner side 72a of the heatshield 70.

The vibration excitation range may further be a function of the axial location of the seal member 76. For instance, near the axial ends 72c/72d where the heatshield 70 is supported (affixed), vibrational amplitude is lower and thus may not increase interference to undesired levels. However, in a range of 25% to 75% of the axial length L of the heatshield 70, which is where the seal member 76 is located, the vibrational amplitude is greatest.

In the illustrated example, the damper member 80 is located adjacent the seal member 76, i.e., at an equivalent or substantially equivalent axial position, in order to attenuate vibration at the location of the seal member 76 where interference from the vibration is of concern. Alternatively, the location of the damper member 80 may be axially shifted from the location of the seal member 76, as long as at the shifted location the damper member 80 can be effective to maintain the interference below desired levels.

Figure 4:
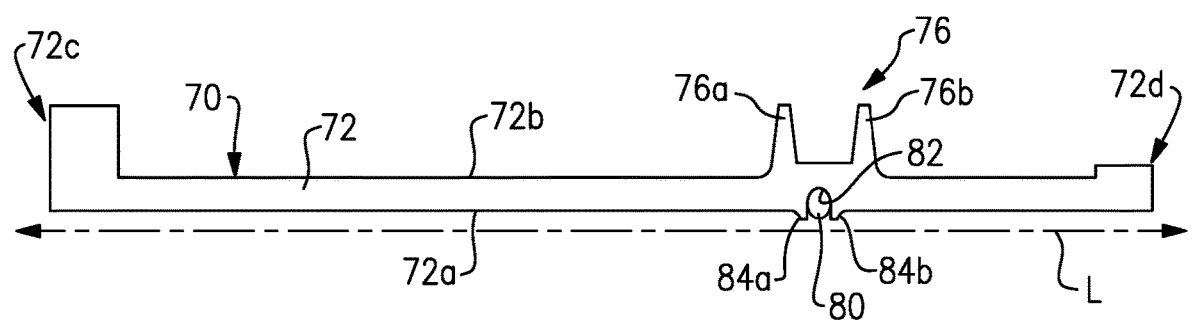
FIG. 4 illustrates a sectioned view of the heatshield.

Referring to FIG. 4, the inner side 72a of the heatshield 70 may define a groove 82 in which the damper member 80 is seated. In this example, the groove 82 is adjacent the seal member 76, such as axially between the seal members 76a/76b. For example, the groove 82 has a semi-circular profile that matches or closely matches the cross-sectional profile of the damper member 80 such that the damper member 80 is in surface-to surface area contact with the groove 82. When vibration occurs, the damper member 80 moves within the groove 82. Friction over the surface-to surface area contact generates heat during the movement, thereby dissipating the vibrational mechanical energy as thermal energy.

The heatshield 70 may optionally further include first and second projecting lips 84a/84b that flank the groove 82. The lips 84a/84b project radially inwards and facilitate retaining the damper member 80 in the groove 82. The lips 84a/84b may also serve to protect the damper member 80 during assembly and operation.

The location of the damper member 80 at the radially inner side 72a of the heatshield 72 also avoids interfering with airflow near the heatshield 70. For instance, there is a cavity (see FIG. 2) radially outwards of the heatshield 70 through which cooling air flows. If the damper member 80 were disposed on the radially outer side 72b of the heatshield 70 it would protrude into the flow of the cooling air, and thereby alter the flow dynamics and, potentially, cooling of downstream components. However, there is an annular dead space 86 between the heatshield 70 and the shaft 50 in which there is no airflow. Thus, the location of the heatshield 70 at the radially inner side 72a, in the dead space 86, does not alter any cooling airflow.

Figure 5:
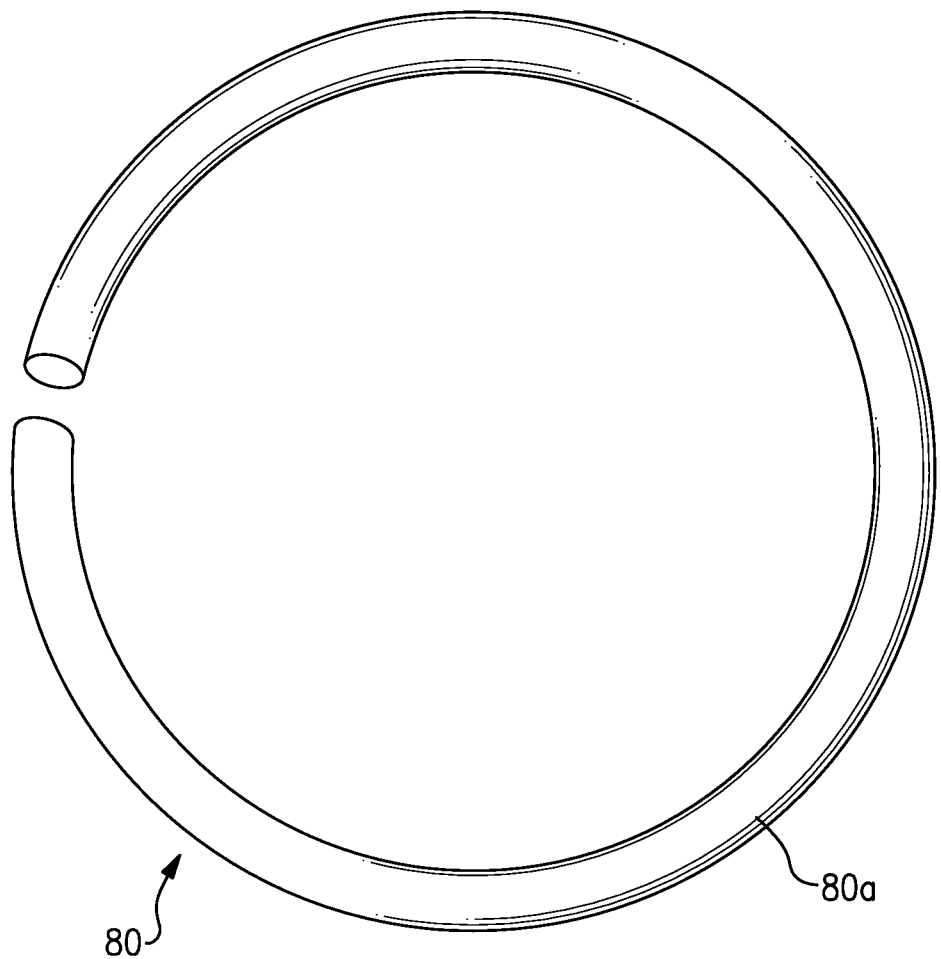
FIG. 5 illustrates a split ring.

FIG. 5 shows an isolated view of an example of the damper member 80. For instance, the damper member 80 is a split ring 80a. The split ring 80a may be annular in shape and may have a circular cross-sectional profile. In one example, the split ring 80a is formed of a superalloy, such as a nickel-based superalloy.

The split ring 80a may be installed into the heatshield 70 by first compressing the split ring 80a to reduce its diameter. In the compressed state the split ring 80a is then inserted into the groove 82. The compression on the split ring 80a is then released and the split ring 80a springs outwards to its original diameter, thereby seating in the bottom of the groove 82. The split ring 80a is configured to be moveable within the groove 82 with respect to the vibration excitation range. For instance, the outward spring force is less than the vibrational force and expected centrifugal force exerted on the split ring 80a, thereby permitting the split ring 80a to move and dissipate energy within the groove 82 under vibration and centrifugal force. In comparison, if the outward spring force were greater than the vibrational force and expected centrifugal force, the vibrational force and expected centrifugal force would be insufficient to overcome the spring force and the split ring 80a would thus remain seated in the bottom of the groove 82 rather than moving in the groove 82 to dissipate energy.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A gas turbine engine comprising:
   a shaft;
   a heatshield circumscribing the shaft,
   the heatshield defining a cylindrical body having radially inner and outer sides and extending between first and second axial ends,
   the heatshield being exclusively supported on the shaft at the first and second axial ends,
   the heatshield including at least one seal member on the radially outer side, the heatshield having an axial length from the first axial end to the second axial end that is from 2.5 centimeters to 13 centimeters, and the at least one seal member is located in a range of 25% to 75% of the axial length; and
   a damper member disposed at the radially inner side of the heatshield for attenuating vibration of the heatshield.

2. The gas turbine engine as recited in claim 1, wherein the shaft comprises a first shaft segment and a second shaft segment coupled in a joint to the first shaft segment, the heatshield circumscribing the joint.

3. The gas turbine engine as recited in claim 1, wherein the inner side of the heatshield defines a groove, and the damper member is seated in the groove.

4. The gas turbine engine as recited in claim 3, wherein the heatshield has a diameter, the diameter and the axial length falling within a vibration excitation range, and wherein the damper member is configured to be moveable within the groove with respect to the vibration excitation range.

5. The gas turbine engine as recited in claim 3, wherein the heatshield further comprises first and second projecting lips flanking the groove.

6. The gas turbine engine as recited in claim 3, wherein the groove is adjacent the at least one seal member.

7. The gas turbine engine as recited in claim 6, wherein the at least one seal member includes first and second seal members, and the groove is between the first and second seal members.

8. The gas turbine engine as recited in claim 1, wherein there is an annular dead space between the heatshield and the shaft and there is no cooling air flow into or out of the annular dead space.

9. The gas turbine engine as recited in claim 1, wherein the damper member is a split ring.

10. The gas turbine engine as recited in claim 1, wherein the cylindrical body extends from the first axial end to the second axial end.

11. The gas turbine engine as recited in claim 10, wherein the shaft comprises a first shaft segment and a second shaft segment coupled in a joint to the first shaft segment, the heatshield circumscribing the joint.

12. The gas turbine engine as recited in claim 1, wherein the at least one seal member includes a knife edge seal.

13. A heatshield assembly for a gas turbine engine, comprising:
a heatshield defining a cylindrical body having radially inner and outer sides and extending between first and second axial ends, the heatshield including at least one seal member on the radially outer side, the heatshield having an axial length from the first axial end to the second axial end that is from 2.5 centimeters to 13 centimeters, and the at least one seal member is located in a range of 25% to 75% of the axial length; and
a split ring damper member disposed at the radially inner side of the heatshield for attenuating vibration of the heatshield.

14. The heatshield assembly as recited in claim 13, wherein the inner side of the heatshield defines a groove, and the damper member is seated in the groove.

15. The heatshield assembly as recited in claim 14, wherein the groove is adjacent the at least one seal member.

16. The heatshield assembly as recited in claim 15, wherein the at least one seal member includes first and second seal members, and the groove is between the first and second seal members.

17. The heatshield assembly as recited in claim 16, wherein the heatshield further comprises first and second projecting lips flanking the groove.

18. A gas turbine engine comprising:
a shaft;
a heatshield circumscribing the shaft,
the heatshield defining a cylindrical body having radially inner and outer sides and extending between first and second axial ends,
an annular space radially bound by the radially inner side of the cylindrical body and the shaft,
the heatshield being exclusively supported on the shaft at the first and second axial ends,
the heatshield including at least one seal member on the radially outer side; and
a damper member disposed in the annular space at the radially inner side of the cylindrical body for attenuating vibration of the heatshield.

* * * * *